US008160129B2

(12) United States Patent
Hirose

(10) Patent No.: US 8,160,129 B2
(45) Date of Patent: Apr. 17, 2012

(54) IMAGE PICKUP APPARATUS AND IMAGE DISTRIBUTING METHOD

(75) Inventor: Toshihiko Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 1593 days.

(21) Appl. No.: 11/332,208

(22) Filed: Jan. 17, 2006

(65) Prior Publication Data

US 2006/0193534 A1 Aug. 31, 2006

(30) Foreign Application Priority Data

Feb. 25, 2005 (JP) ................................ 2005-050368

(51) Int. Cl.
*H04N 11/02* (2006.01)
*G06K 9/00* (2006.01)

(52) U.S. Cl. .................. 375/240.01; 382/103; 382/232; 382/291

(58) Field of Classification Search ............. 375/240.01; 382/232, 236, 291
See application file for complete search history.

(56) References Cited

U.S. PATENT DOCUMENTS

| | | | | |
|---|---|---|---|---|
| 6,816,184 | B1 | 11/2004 | Brill et al. | |
| 7,023,913 | B1 * | 4/2006 | Monroe | 375/240.01 |
| 2004/0150519 | A1 * | 8/2004 | Husain et al. | 340/506 |
| 2006/0013495 | A1 * | 1/2006 | Duan et al. | 382/235 |

FOREIGN PATENT DOCUMENTS

| | | | |
|---|---|---|---|
| EP | 1 482 741 | A2 | 12/2004 |
| JP | 6-105312 | | 4/1994 |
| JP | 6-266841 | | 9/1994 |
| JP | 7-212748 | | 8/1995 |
| JP | 2000-59758 | | 2/2000 |
| JP | 2002-34030 | | 1/2002 |
| JP | 2002-077809 | | 3/2002 |
| JP | 2002-354459 | | 12/2002 |
| JP | 2003-284044 | | 10/2003 |
| WO | WO 03/044727 | A1 | 5/2003 |
| WO | WO 03/058960 | A1 | 7/2003 |
| WO | WO 2004/006184 | A2 | 1/2004 |

OTHER PUBLICATIONS

"AXIS 211 Network Camera, Superior video quality for professional indoor and outdoor applications", URL:http://web.archive.org/web/20050207165657/, http://www.axis.com/products/cam_211/index.htm>, XP-002395161, Feb. 7, 2005, 4 pages.

* cited by examiner

*Primary Examiner* — Shuwang Liu
*Assistant Examiner* — David Huang
(74) *Attorney, Agent, or Firm* — Oblon, Spivak, McClelland, Maier & Neustadt, L.L.P.

(57) ABSTRACT

An image pickup apparatus capable of distributing a picked up image through a network is provided. The image pickup apparatus includes an image pickup unit configured to pick up an image of a predetermined monitoring area and output an image signal thereof; a plurality of encoding units configured to simultaneously convert the image signal into video data of different encoding methods; a moving-object detecting unit configured to detect a moving object entered the monitoring area based on the image signal; an unmoving-object detecting unit configured to detect an unmoving object in the monitoring area based on the image signal; and a transmission control unit configured to control distribution of the video data to the network based on a detection result generated by the moving-object detecting unit and the unmoving-object detecting unit.

15 Claims, 9 Drawing Sheets

IMAGE PICKUP APPARATUS AND IMAGE DISTRIBUTING METHOD

CROSS REFERENCES TO RELATED APPLICATIONS

The present invention contains subject matter related to Japanese Patent Application JP 2005-050368 filed in the Japanese Patent Office on Feb. 25, 2005, the entire contents of which are incorporated herein by reference.

BACKGROUND OF THE INVENTION

1. Field of the Invention

The present invention relates to an image pickup apparatus capable of distributing picked up images through a network and to an image distributing method used in the apparatus. Particularly, the present invention relates to an image pickup apparatus and an image distributing method capable of obtaining an image of an encoding method suitable for an environment, such as a communication speed of a network and a storage capacity.

2. Description of the Related Art

In a known method for guarding a megastructure, several hundreds of monitoring cameras are set in a guard area, video images picked up by those cameras are displayed on several tens of monitors in a time-division manner, and observers observe these images on the monitors in real time. In recent years, an IP camera (Internet protocol camera, also called a network camera) connected to a network through Ethernet® or the like has been used as a monitoring camera. The IP camera has a characteristic of broadcasting video images to a plurality of client monitoring terminals, such as PCs (personal computers) so that the images can be monitored. In addition, the IP camera has an advantage of enabling the client monitoring terminals to control the IP camera, for example, control pan/tilt or zoom or select a preset position.

In such a monitoring camera system using a network, the cost increases as the scale of the system configuration becomes larger. In order to suppress the increase in the cost, the following system is suggested. That is, a moving-object sensor to detect an abnormal motion in a monitoring area is provided in each monitoring camera, and only signals output from monitoring cameras selected in accordance with a detection output of the moving-object sensor are transmitted to a signal recording/playback unit (e.g., see Patent Document 1: Japanese Unexamined Patent Application Publication No. 07-212748 (paragraphs [0027] to [0040] and FIG. 6)). Accordingly, only signals output from monitoring cameras that are selected in accordance with a detection output of the moving-object sensor can be transmitted to a monitor. With this configuration, an observer need not monitor the monitor in real time, so that a monitoring operation can be efficiently performed.

SUMMARY OF THE INVENTION

In the known monitoring camera system using a network, video signals are transmitted at a predetermined transmission rate by using a specific video encoding method. However, the network environment on the client monitoring terminal side is diversified. Therefore, a system in which signals can be received at an optimal transmission rate according to the respective network environments has been required.

For example, in a case where an unidentified object such as an explosive is to be detected in a specific area in the known monitoring camera system, if only placing and leaving of the unidentified object is detected by unmoving-object detection, images captured before/after the object is left, that is, images of a person who carried the unidentified object need to be accumulated. In order to accumulate those images, a large-capacity storage unit such as a hard disk drive (HDD) needs to be provided on the network side. On the other hand, in a system configured to perform only moving-object detection, images of moving objects can be simply recorded, but necessary images cannot always be recorded.

The present invention has been made in view of these circumstances and is directed to provide an image pickup apparatus capable of reliably recording necessary images based on images picked up in a monitoring area while reducing a storage capacity.

Also, the present invention is directed to provide an image distributing method capable of reliably recording necessary images based on images picked up in a monitoring area while reducing a storage capacity.

According to an embodiment of the present invention, there is provided an image pickup apparatus capable of distributing a picked up image through a network. The image pickup apparatus includes: an image pickup unit configured to pick up an image of a predetermined monitoring area and output an image signal thereof; a plurality of encoding units configured to simultaneously convert the image signal into video data of different encoding methods; a moving-object detecting unit configured to detect a moving object entered the monitoring area based on the image signal; an unmoving-object detecting unit configured to detect an unmoving object in the monitoring area based on the image signal; and a transmission control unit configured to control distribution of the video data to the network based on a detection result generated by the moving-object detecting unit and the unmoving-object detecting unit.

The image pickup unit picks up an image of a predetermined monitoring area and outputs an image signal thereof. The plurality of encoding units simultaneously converts the image signal into video data of different encoding methods. The moving-object detecting unit detects a moving object entered the monitoring area based on the image signal. The unmoving-object detecting unit detects an unmoving object in the monitoring area based on the image signal. The transmission control unit controls distribution of the encoded video data to the network based on a detection result generated by the moving-object detecting unit and the unmoving-object detecting unit.

According to another embodiment of the present invention, there is provided an image distributing method for distributing a picked up image through a network. The image distributing method includes the steps of: simultaneously converting an image signal that is obtained by picking up an image of a predetermined monitoring area into video data of different encoding methods; detecting a moving object entered the monitoring area based on the image signal; detecting an unmoving object in the monitoring area based on the image signal; and controlling distribution of the video data to the network based on a detection result of the moving object and the unmoving object.

In this image distributing method, an image signal obtained by picking up an image of a predetermined monitoring area is simultaneously converted to video data of different encoding methods, a moving object entered the monitoring area is detected based on the image signal, and an unmoving object in the monitoring area is also detected. Based on a detection result of the moving object and the unmoving object, distribution of the encoded video data to the network is controlled.

According to the embodiments of the present invention, encoded image data of a plurality of encoding methods can be dealt with by one image pickup apparatus. Therefore, in a case where a picked up image is broadcasted to many user terminals, the respective users connected to the image pickup apparatus can select a specific codec in accordance with their network environment. Also, moving-object detection and unmoving-object detection are performed at the same time and distribution of encoded image data is controlled based on the detection result. Therefore, the user terminals can receive and accumulate only data about necessary images, so that the storage capacity can be significantly reduced.

DESCRIPTION OF THE PREFERRED EMBODIMENTS

Hereinafter, an IP camera, which is an example of an image pickup apparatus according to an embodiment of the present invention, is described with reference to the drawings.

Figure 1:
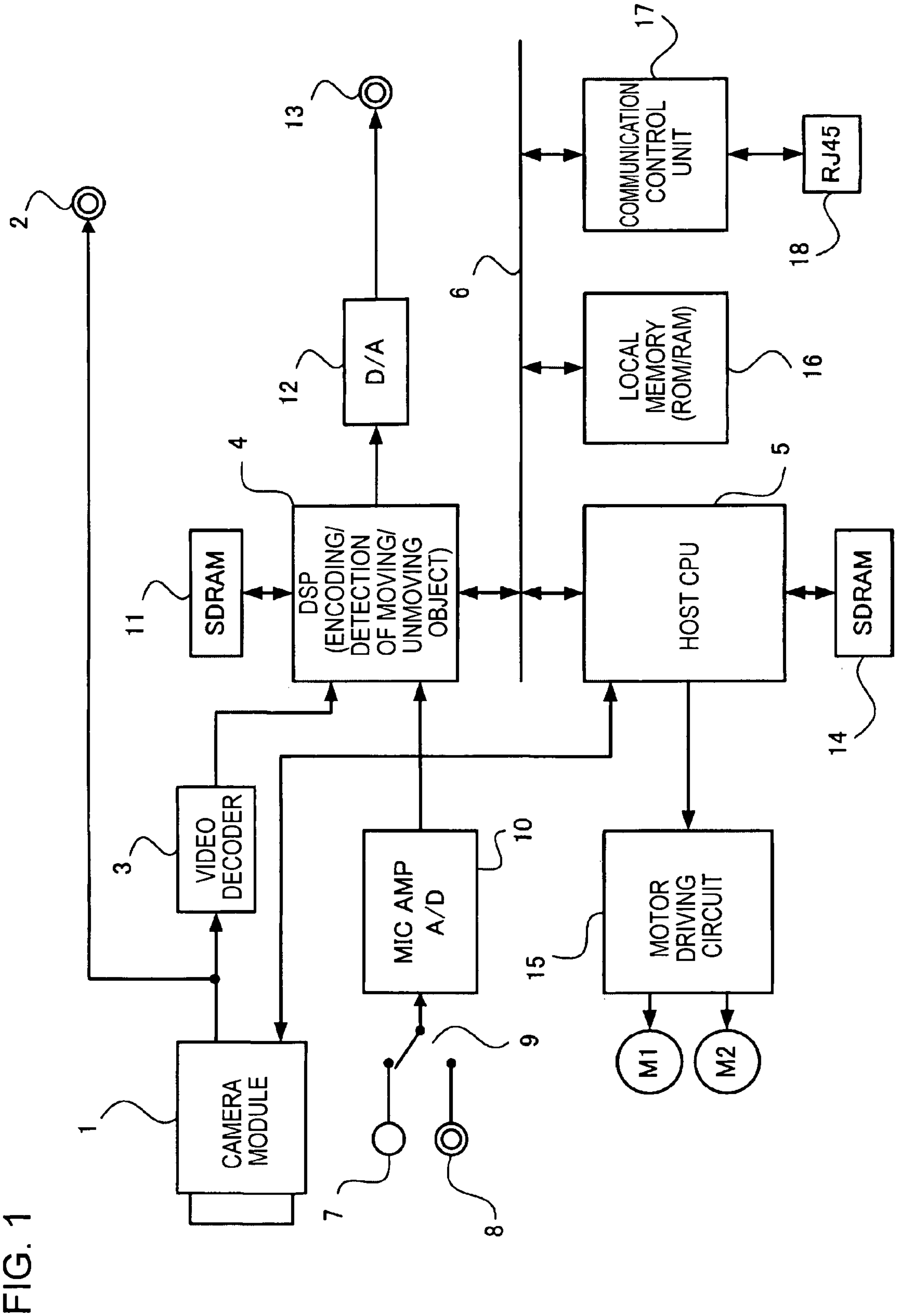
FIG. 1 is a block diagram showing the entire configuration of an IP camera according to an embodiment of the present invention.

FIG. 1 is a block diagram showing the entire configuration of the IP camera according to the embodiment.

A camera module 1 includes main components of the IP camera, that is, a lens, an image pickup device such as a CCD (charge coupled device), and a video signal processing circuit. The image pickup device of the camera module 1 outputs analog composite video signals generated by shooting a predetermined monitoring area to a video monitor terminal 2 and to a video decoder (NTSC (National Television Standards Committee) decoder) 3. The analog composite video signals are processed by a predetermined video processing in the video decoder 3 and are output as digital video signals compatible with BT-656 to a DSP (digital signal processor) 4.

Although the specific configuration of the DSP 4 is described below with reference to FIG. 2, the DPS 4 mainly has the following two functions. One of them is a function of converting a digital video signal to video data of a plurality of encoding methods. The video data encoded by the DSP 4 is transmitted to or received by a host CPU (central processing unit) 5 through a local bus 6. The other is a function of simultaneously performing moving-object detection and unmoving-object detection. With this function, the DSP 4 can simultaneously transmit detection results about moving- and unmoving-objects existing in the monitoring area of the IP camera to the host CPU 5.

The IP camera also includes an audio terminal 7 to receive voice from an incorporated microphone and an external audio terminal 8 to which an external microphone is connected. These two terminals 7 and 8 can be connected to an audio input circuit 10 via a switch 9. The audio input circuit 10 amplifies an analog audio signal, converts the analog audio signal to a digital signal, and supplies the digital signal to the DSP 4.

The DSP 4 connects to an SDRAM (synchronous dynamic random access memory) 11 and a D/A converter 12. The SDRAM 11 is used as a working area of the DSP 4. The D/A converter 12 connects to a monitor terminal 13 for audio data. Audio signals corresponding to picked up images are output from the monitor terminal 13.

The host CPU 5 connects to the camera module 1, an SDRAM 14, and a motor driving circuit 15. The SDRAM 14 accumulates encoded video data according to need. The host CPU 5 generates stream data or a data file by using the video data accumulated in the SDRAM 14 and based on a detection result about a moving/unmoving object obtained by the DSP 4 and outputs the stream data or the data file to a network through a communication control unit 17. Also, the host CPU 5 is capable of outputting data of a specified encoding method to the network in accordance with a control signal received through the network.

Further, the host CPU 5 can allow the motor driving circuit 15 to drive a pan motor M1 and a tilt motor M2. That is, the host CPU 5 can control the camera module 1 in accordance with a detection result about a moving/unmoving object existing in a monitoring area or adjust the zoom magnification of the lens mechanism thereof.

The host CPU 5 connects to a local memory 16 including a ROM (read only memory) and a RAM (random access memory) and to the communication control unit 17 through the local bus 6. The local memory 16 functions as an AV buffer to store encoded video data and audio data and as a program memory to store a program such as an event manager.

The communication control unit 17 is provided with a connection terminal 18, such as RJ 45, for Ethernet. With this configuration, the stream data and the data file generated by the host CPU 5 can be distributed to client monitoring terminals through a network.

Next, a data flow in the DSP 4 among the circuit blocks of the above-described IP camera is described.

Figure 2:
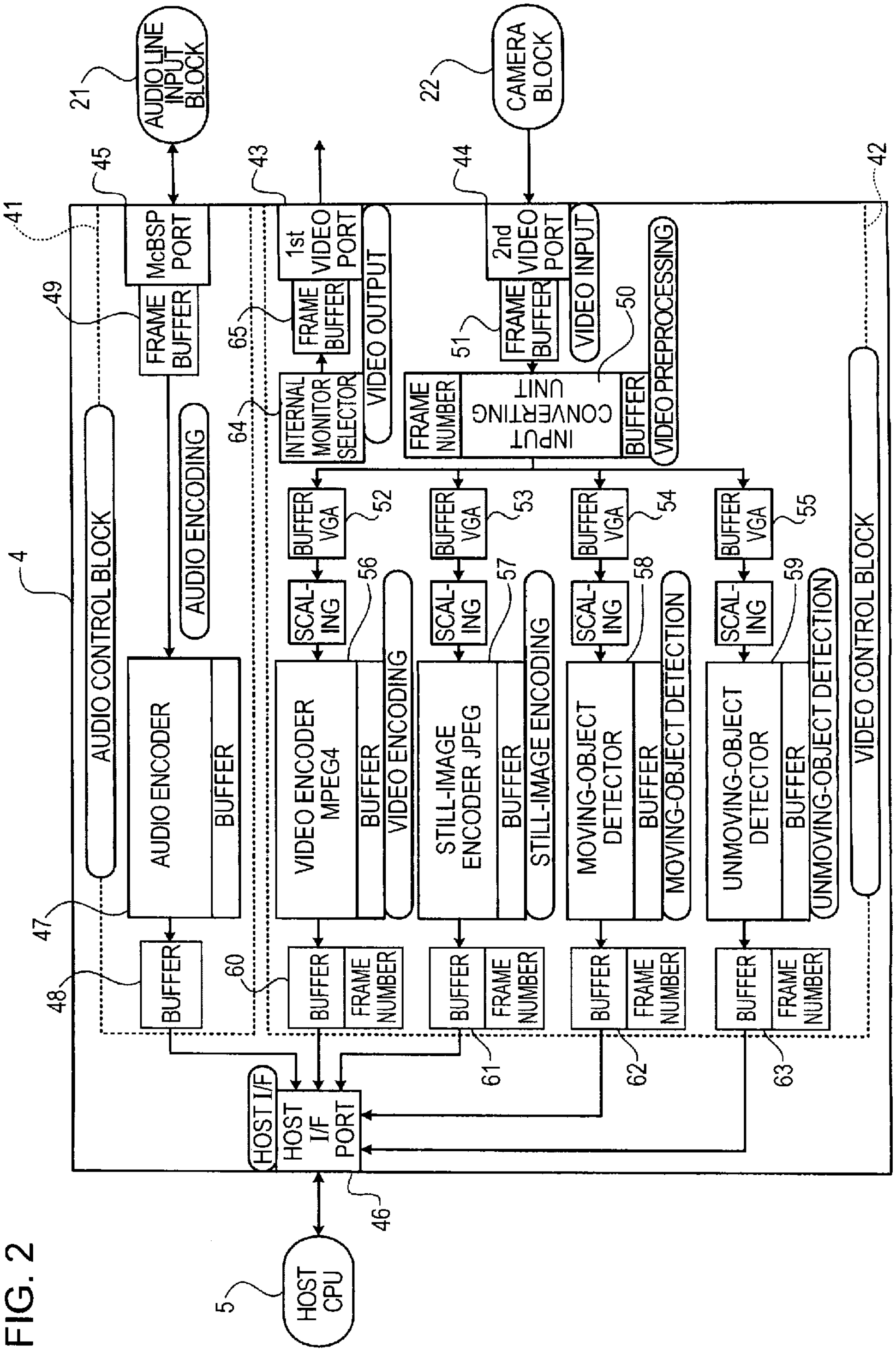
FIG. 2 is a block diagram showing the entire configuration of a data processing unit in the IP camera.

FIG. 2 is a block diagram showing the entire configuration of the data processing unit in the IP camera shown in FIG. 1.

The DSP 4 includes an audio control block 41 to control audio data and a video control block 42 to control video data. The audio control block 41 has a function of controlling an audio encoding task, whereas the video control block 42 has a function of controlling the following tasks: video input, video preprocessing, video encoding, still-image encoding, moving-object detection, unmoving-object detection, video output, host interface (I/F), video output, and so on.

Also, the DSP 4 includes a first video port 43 to output video data, a second video port 44 to receive input of video data, an audio port (McBSP port) 45 to receive input of audio data, and a host I/F port 46 functioning as a serial I/F for the host CPU 5. These ports transmit/receive data to/from an audio line input block 21, a camera block 22 including the camera module 1 and so on, and the host CPU 5, respectively.

In an audio encoding task, audio data input from the audio port 45 through a frame buffer 49 is compressed and encoded by an audio encoder 47 and is supplied to a buffer 48.

In a video inputting task, digital video data from the camera block 22 is accumulated in a frame buffer 51 through the second video port 44. In a video preprocessing task, an input converting unit 50 performs format conversion to a VGA (video graphics array), IP (interlace-progressive) conversion, and square lattice processing on the video data read from the frame buffer 51. The video data is then output to four buffers 52 to 55.

In a video encoding task, the video data read from the buffer 52 is scaled, is compressed and encoded in an MPEG (Moving Picture Experts Group) 4 method by a video encoder 56, and is output to a buffer 60. In a still-image encoding task, the video data read from the buffer 53 is scaled, is compressed and encoded in a JPEG (Joint Photographic Experts Group) method by a still-image encoder 57, and is output to a buffer 61. Incidentally, the still-image encoder 57 can sequentially generate still images of the JPEG method in order to generate moving image data of 30 fps, for example, not using an interframe prediction coding.

In a moving-object detecting task, the video data read from the buffer 54 is scaled, a moving object is detected by a moving-object detector 58, and a detection result is output to a buffer 62. In an unmoving-object detecting task, the video data read from the buffer 55 is scaled, an unmoving object is detected by an unmoving-object detector 59, and a detection result is output to a buffer 63. The detection results input to the buffers 62 and 63 include, as will be described below, moving-object detection data and unmoving-object detection data describing the coordinate data; size; detection time; and stay period of the detected moving/unmoving objects, and frame information obtained at the detection.

Frame numbers are assigned to the respective image data and detection result data input to the buffers 60 to 63, so that the data can be synchronized with each other. These data are read in a host I/F task and are output to the host CPU 5 through the host I/F port 46.

Also, the video control block 42 is provided with an internal monitor selector 64 to directly pick up video signals from the IP camera. With this configuration, uncompressed video data can be output from the first video port 43 through a frame buffer 65.

Next, an example of the configuration of a monitoring camera system using the above-described IP camera, which can output images of a plurality encoding methods, is described.

Figure 3:
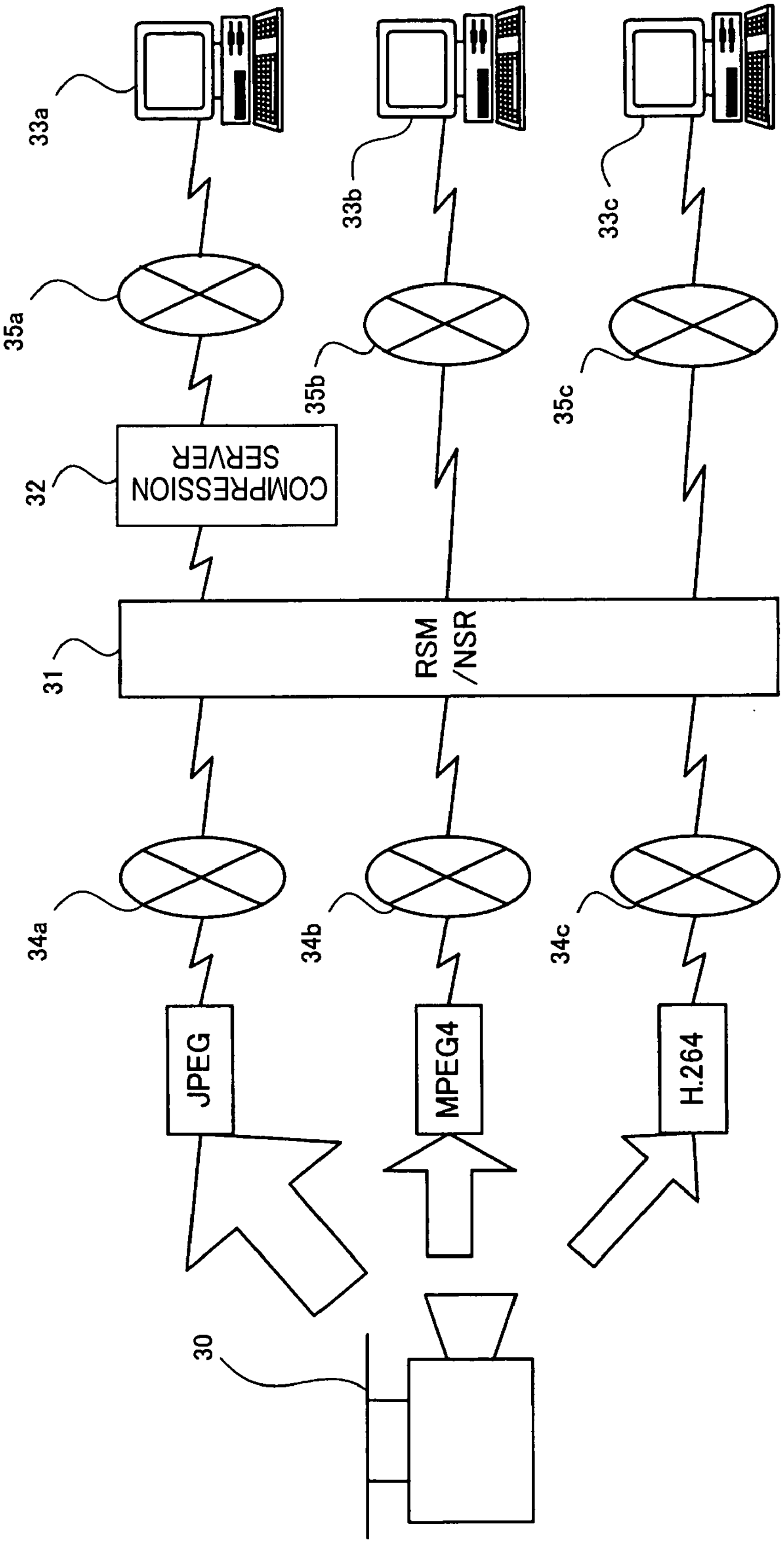
FIG. 3 is a block diagram showing a monitoring camera system using images of a plurality of encoding methods.

FIG. 3 is a block diagram showing the monitoring camera system using images of a plurality of encoding methods.

This monitoring camera system includes at least one IP camera 30 having the above-described network function, a network digital recorder (hereinafter referred to as "RSM/NSR" (real shot manager/network severance recorder)) 31 to accumulate video data and audio data obtained by the IP camera 30, a compression server 32 to compress image data before distributing JPEG data, client monitoring terminals 33*a* to 33*c* used by clients to monitor the data accumulated in the RSM/NSR 31, data networks 34*a* to 34*c* to connect the IP camera 30 to the RSM/NSR 31, and data networks 35*a* to 35*c* to connect the RSM/NSR 31 to the client monitoring terminals 33*a* to 33*c*.

The RSM/NSR 31 is configured by combining an NSR serving as a network digital recorder and an RSM serving as software to transfer video data from a plurality of IP cameras 30 to the NSR and accumulate the video data therein.

Video data output to the connection terminal 18, such as RJ45, of the IP camera shown in FIG. 1 is transmitted to the RSM/NSR 31 through various data networks, such as Ethernet or an ISDN (integrated services digital network) line. The RSM/NSR 31 can receive video data that is converted to JPEG data of a low compression rate if the data network 34*a* connecting the RSM/NSR 31 to the IP camera 30 is a broadband network of 10 Mbps, for example. If the data network 34*b* is ISDN, the RSM/NSR 31 can receive data that is encoded with an MPEG4 format of a high compression rate in accordance with the communication band. If the data network 34*c* is an analog telephone line for dial-up connection, the communication speed is about 28.8 to 56 Kbps. In this case, the RSM/NSR 31 can receive encoded data of an H.264 format having a higher compression rate.

If the client monitoring terminal 33*a* requests an image file of a JPEG format, an image file that is compressed at a predetermined compression rate can be distributed from the compression server 32 to the data network 35*a*.

Figure 4A:
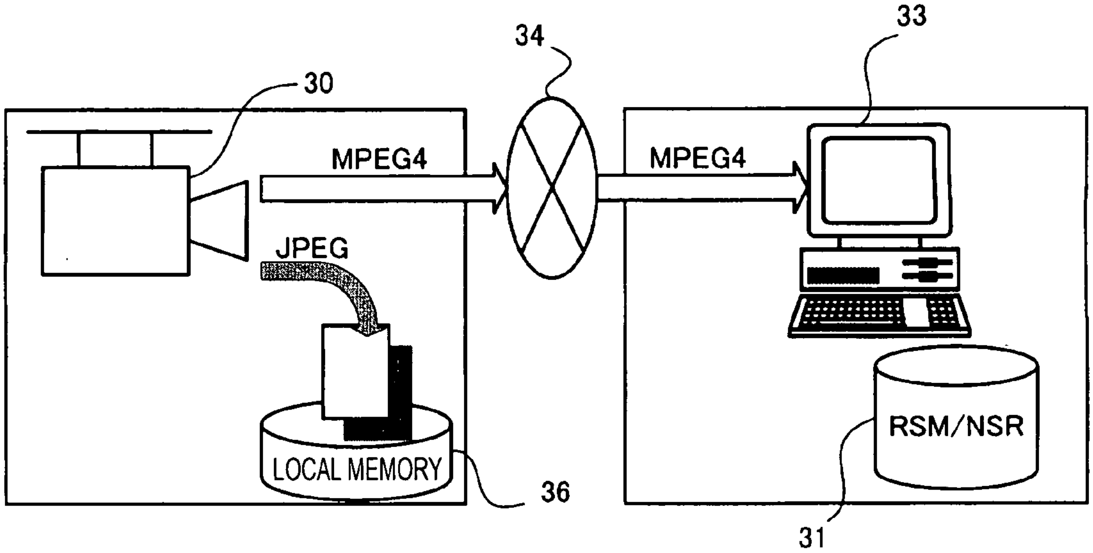
FIGS. 4A and 4B are data flow diagrams showing a flow of image data in two types of monitoring camera systems.
Figure 4B:
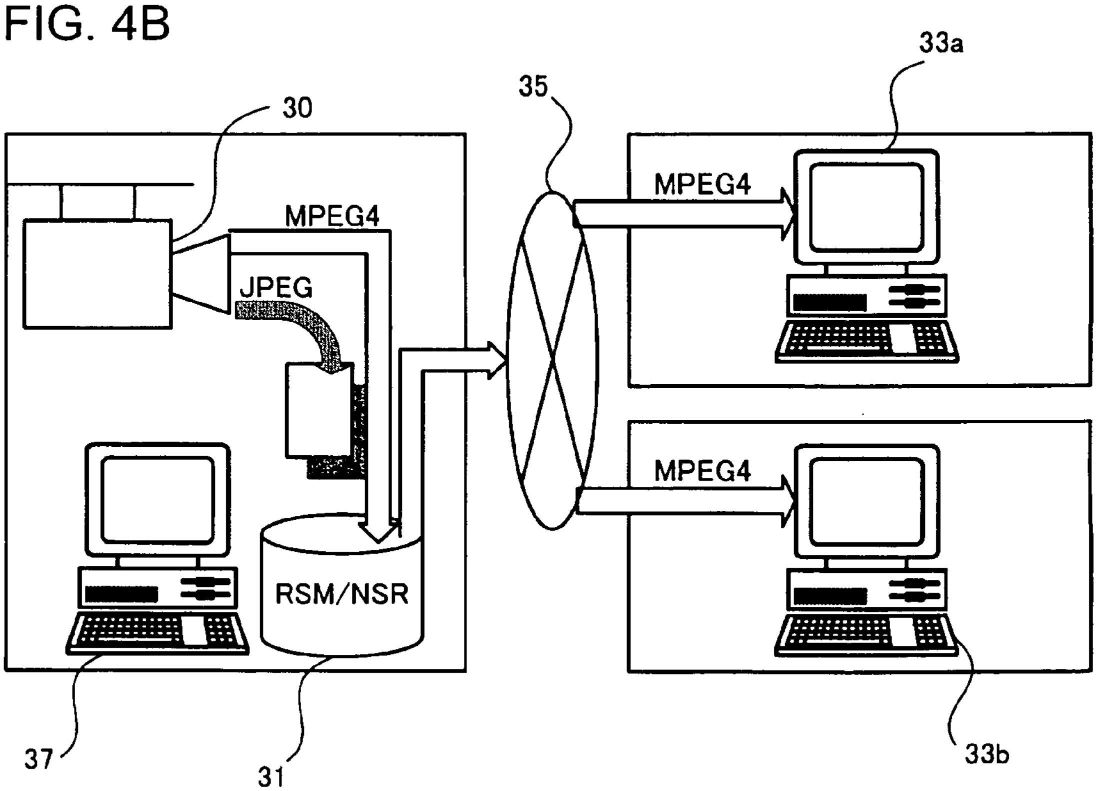

FIGS. 4A and 4B are data flow diagrams illustrating a flow of image data in two types of monitoring camera systems.

FIG. 4A shows a first monitoring camera system. In this system, a local memory 36 is placed near the IP camera 30 that is set in a monitoring area (local area). In a place (remote area) far from this monitoring area, the client monitoring terminal 33 and the RSM/NSR 31 serving as a large-capacity hard disk are set as a network digital recorder. In this case, image data obtained by the IP camera 30 is recorded as JPEG data in the local memory 36, whereas MPEG4 data of the same video image is transmitted to the RSM/NSR 31 on the client monitoring terminal 33 side through the network 34, so that the video image of the monitoring area is displayed on a monitor.

FIG. 4B shows a second monitoring camera system. In this system, a monitoring PC 37 and the RSM/NSR 31 are set as a network digital recorder near the monitoring area. The JPEG data and MPEG4 data output from the IP camera 30 are once stored in the RSM/NSR 31. At the same time, image data in the form of MPEG4 data is transmitted to the plurality of client monitoring terminals 33*a* and 33*b* through the network 35.

In any of these system configurations, the IP camera 30 transmits image data of a plurality of encoding methods. Accordingly, JPEG data is used to store the image data and MPEG4 data is used for monitoring. Therefore, in the monitoring camera system using the IP camera 30, limited network resources can be optimally used.

Next, detection of a moving object performed by the IP camera 30 is described.

Figure 5:
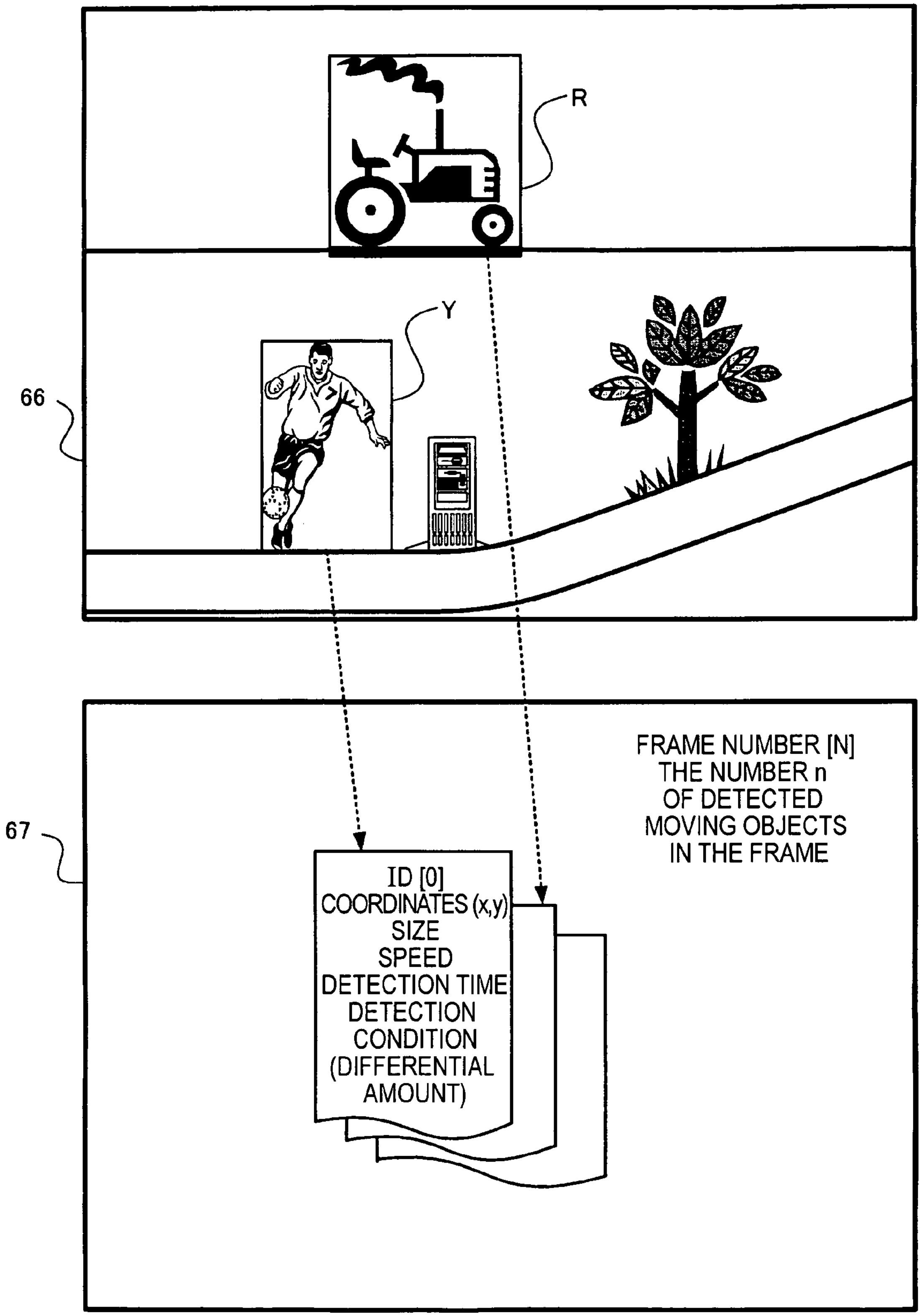
FIG. 5 shows the relationship between a monitored image and moving-object detection data.

FIG. 5 shows the relationship between a monitored image and moving-object detection data.

Now, assume that a person Y and a train R are shown as moving objects in a monitored image 66. In moving-object detection, the person Y and the train R need to be identified as different moving objects in a specific frame. Thus, moving-object detection data 67 is generated. The moving-object detection data 67 includes frame information including a frame number [N] and the number n of detected moving objects in the frame; and moving-object information about the detected moving objects.

Herein, the frame information serving as a moving-object detection result includes the frame number processed and the number of detected moving objects (in this case, the person Y and the train R, that is, n=2). As the moving-object information, information about the person Y and information about the train R are recorded in different files. Each information includes coordinate data, size of the object, speed of the object, detection time, and detection condition. At this time, a frame count for frame synchronization is embedded as time information corresponding to the detection time in each file.

Figure 6:
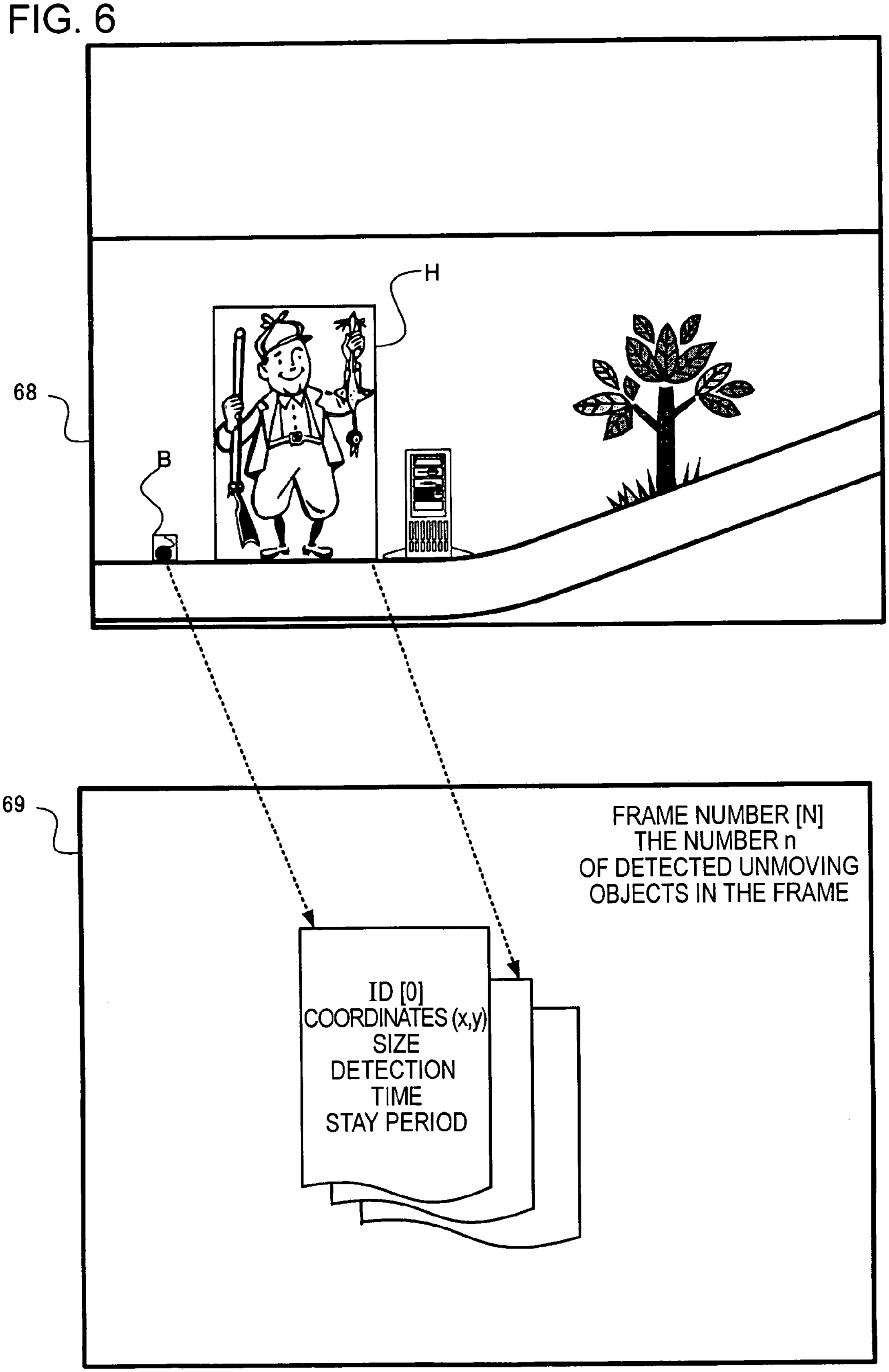
FIG. 6 shows the relationship between a monitored image and unmoving-object detection data.

FIG. 6 shows the relationship between a monitored image and unmoving-object detection data.

In the monitored image 68, an explosive B and a person H are shown as unmoving objects. In the unmoving-object detection, the explosive B and the person H that do not move for a preset time period are recognized as unmoving objects in an area except background data constituting the monitored image in a specific frame. At this time, the explosive B and the person H need to be identified as different unmoving objects, as in the above-described moving-object detection. Therefore, unmoving-object detection data 69 is generated. The unmoving-object detection data 69 includes frame information including a frame number [N] and the number n of detected unmoving objects in the frame; and unmoving-object information about the detected unmoving objects.

Herein, the frame information serving as an unmoving-object detection result includes the frame number processed and the number of detected unmoving objects (in this case, the explosive B and the person H, that is, n=2). As the unmoving-object information, information about the explosive B and information about the person H are recorded in different files. Each information includes coordinate data, size of the object, detection time, and stay period. If the stay period is longer than a predetermined reference value, an alarm occurs. A frame count for frame synchronization is embedded as time information corresponding to the detection time and the stay period in each file.

Next, a procedure of message communication performed in the DSP 4 is described together with each task that is performed in a time division manner.

Figure 7:
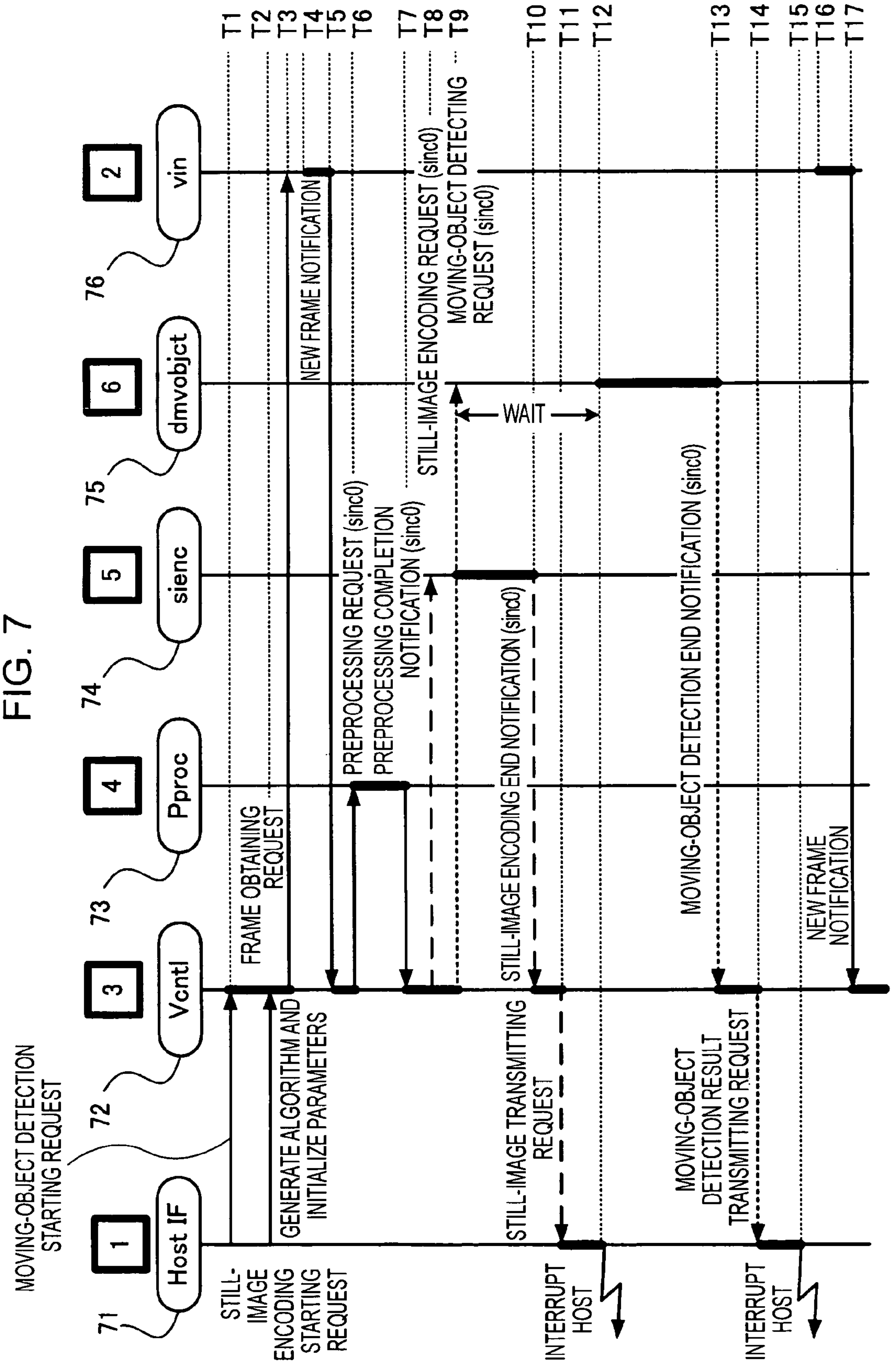
FIG. 7 is a timing diagram showing a procedure of still-image processing and moving-object detection performed in a DSP according to the embodiment.

FIG. 7 is a timing diagram showing the procedure of still-image processing and moving-object detection in the DSP. In the figure, the vertical direction indicates a time axis and the horizontal direction indicates each task.

The numbers 1 to 6 inside the square frames shown at the top of FIG. 7 indicate the priority of tasks performed in the DSP 4 (task priority).

At timing T1 and timing T2, starting still-image encoding and starting moving-object detection are requested to a task process of video control (Vcntl) 72 by a task process of host I/F 71 in accordance with a request from the host CPU 5. In the task process of video control (Vcntl) 72, an algorithm of JPEG is generated and parameters are initialized. Then, at timing T3, a frame obtaining request is transmitted to a task process of video input (vin) 76.

At timing T4, the task process of video input (vin) 76 receives the frame obtaining request, obtains video data of one frame that was captured by the video decoder 3, and transmits a new frame notification to the task process of video control (Vcntl) 72. The capturing of video data is repeated every Hsync.

At timing T5, the task process of video control (Vcntl) 72 receives the new frame notification and requests preprocessing on a specified buffer (sinc0) to the task process of preprocessing (Pproc) 73.

At timing T6, the task process of preprocessing (Pproc) 73 is executed in response to the preprocessing request. At timing T7 when the task process of preprocessing (Pproc) 73 completes, a preprocessing completion notification is transmitted. Accordingly, the task process of video control (Vcntl) 72 receives the preprocessing completion notification and transmits a still-image processing request of the specified frame (sinc0) to the task process of still-image encoding (sienc) 74 at timing T8.

In the task process of still-image encoding (sienc) 74, encoding JPEG data starts at timing T9. At the same time, the video control (Vcntl) 72 outputs a task process request to the moving-object detection (dmvobjct) 75. However, since the task has lower priority than the still-image encoding (sienc) 74, the process waits until timing T12. When the still-image encoding (sienc) 74 completes at timing T10, a still-image encoding end notification (sinc0) is transmitted to the video control (Vcntl) 72. Then, at timing T11, a request to transmit the still image to the host CPU 5 is output to the task process of host I/F 71. Accordingly, the host CPU 5 receives input of the still-image data (JPEG data) by an interrupt.

At timing T12, the task process of moving-object detection (dmvobjct) 75, which has been in a waiting state, starts. This process ends at timing T13. Then, a moving-object detection end notification is transmitted to the task process of video control (Vcntl) 72, and a detection result is transmitted to the host CPU 5 by the task process of host I/F 71 by interrupt (timing T14 and timing T15). After that, capturing video data of the next frame starts at timing T16. After the video data is captured, a new frame notification is transmitted to the task process of video control (Vcntl) 72, and then still-image encoding and moving-object detection are performed on the new frame.

If the moving-object detection (dmvobjct) 75 of lower priority is not yet completed when the new frame is captured (timing T16), the buffer (sinc0) is not opened. Therefore, the task process of video control (Vcntl) 72 generates a new buffer (sinc1) when requesting preprocessing. The task process of video control (Vcntl) 72 preferentially executes a high-priority process (e.g., still-image encoding). During this process, moving-object detection using the buffer (sinc0) is executed and the buffer (sinc0) is opened when the process completes. In this way, depending on the processing ability of the DSP 4, moving-object detection of one frame may be executed over a plurality of Hsync periods. However, a frame number is assigned to each moving-object detection result, and thus the host CPU 5 can easily bring respective frames into synchronization with each other.

The message communication in a parallel operation of still-image encoding and moving-object detection has been described above. Likewise, unmoving-object detection and MPEG video encoding can be performed in parallel.

Next, data transfer control in the host CPU 5 is described.

Figure 8:
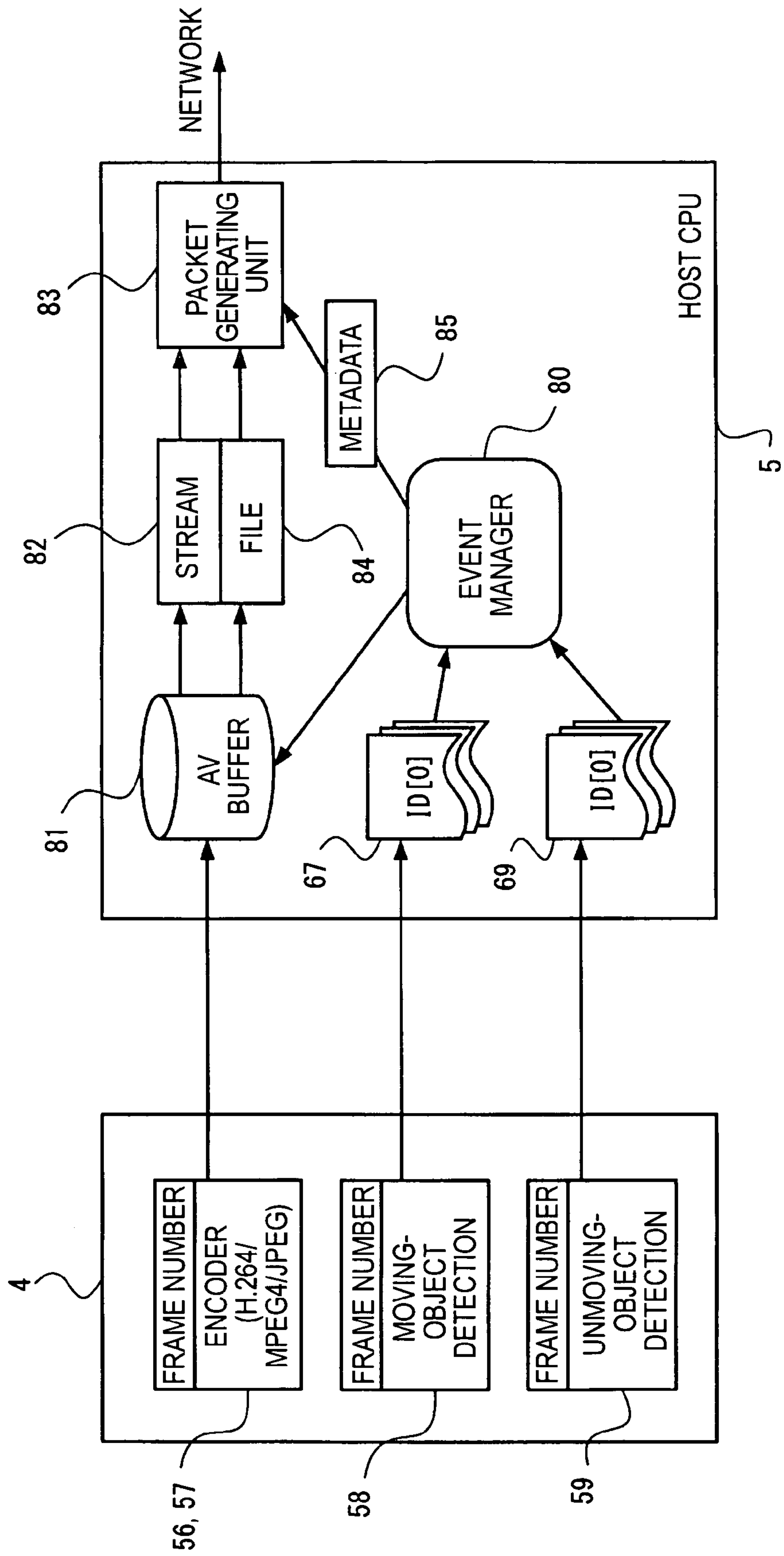
FIG. 8 is a data flow diagram showing a signal transmitting procedure in the IP camera according to the embodiment.

FIG. 8 is a data flow diagram showing a signal transmitting procedure in the IP camera according to the embodiment. In the host CPU 5, three types of data can be transmitted.

First data is video and audio data. These data include JPEG/MPEG video images that are compressed by the video encoder 56 and the still-image encoder 57 of the DSP 4 by predetermined selected encoding methods. These data are stored in an AV buffer 81, output therefrom as bit stream data 82, and distributed to the data network.

Second data is an alarm about a result of moving-object detection or unmoving-object detection. In a moving-/unmoving-object detection mode, the moving-object detection data 67 or the unmoving-object detection data 69 is transmitted to an event manager 80 that controls the entire task on the host CPU 5. When a moving object or an unmoving object is detected, only necessary information of the bit stream data (JPEG/MPEG compressed video data) in the AV buffer 81 is extracted into a file 84 of a predetermined size, and the file 84 is transmitted to the network by an FTP (file transfer protocol), for example. Herein, the necessary information includes monitored images captured before/after a moving object or an unmoving object is detected.

These first and second data are stored in the SDRAM 14, packetized by a packet generating unit 83, and output to the network. On the other hand, third data is metadata 85 describing information about various data to be transferred from the host CPU 5 to each client monitoring terminal. The metadata 85 is generated by the event manager 80, packetized as moving-object detection information or unmoving-object detection information, and then transmitted through the network. The information may include an arbitrary item of the content of the above-described moving-object detection data 67 or unmoving-object detection data 69.

Frame numbers are assigned to all of the data transmitted from the DSP 4 to the host CPU 5. Therefore, the AV buffer 81 and the event manager 80 can easily bring encoded image data/moving-object detection information/unmoving-object detection information into synchronization with each other. Also, the monitoring system can be made intelligent by further using a corresponding recorder of AV data.

Figure 9:
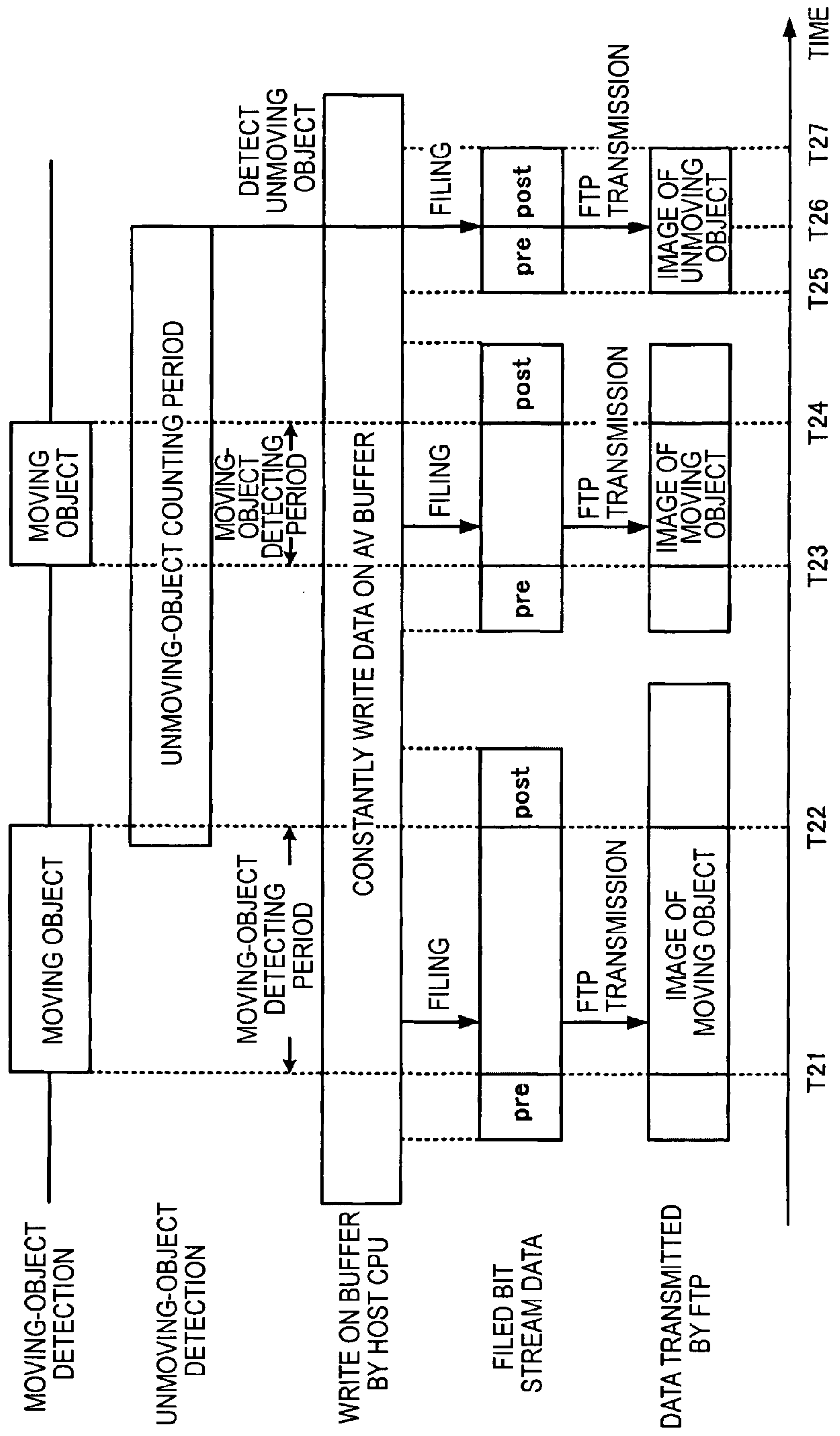
FIG. 9 is a data flow diagram showing an example of an image transmitting procedure in the IP camera according to the embodiment.

FIG. 9 is a data flow diagram showing an example an image transmitting procedure in the IP camera according to the embodiment. Herein, the horizontal axis is a time axis.

In this figure, moving-object detection is performed in a period from time T21 to T22 and in a period from time T23 to T24. Herein, assume that a person who left an unidentified object, such as an explosive, is a moving object to be detected in the two detection periods, and that the unidentified object is an unmoving object to be detected. In this case, assume that an unmoving-object counting period starts before the first moving-object detection period ends (at time T22) and that an unmoving object is detected at time T26.

The host CPU 5 constantly writes image data of a plurality of encoding methods, such as JPEG and MPEG4, in the AV buffer 81 (FIG. 8). Therefore, based on a result of moving-object detection, images captured during the moving-object detection period (actually includes a predetermined period before/after the detection period) are extracted from the AV buffer 81 and are filed as bit stream data. Also, based on a result of unmoving-object detection, images captured during a predetermined period (time T25 to T27) before/after the detection timing (time T26) are extracted from the AV buffer 81 and are filed as bit stream data of MPEG4 (or Motion-JPEG) or as still-image data of JPEG or the like. The filed data is transmitted through the network by an FTP or the like, and a client monitoring terminal having a recorder function can store the data therein. Alternatively, the image data captured during the moving-object detection period can be distributed in a stream by a low-bit-rate encoding method (in this case, MPEG4), and the image data captured before/after the unmoving object is detected can be transmitted as still-image data (JPEG) by an FTP.

As described above, since unmoving-object detection and moving-object detection are simultaneously performed inside the IP camera, video images showing the movement path of the person who left an unidentified object can be monitored through a network. In addition, only image data showing the person and the unidentified object can be reliably stored.

For example, in a system capable of detecting only moving objects, image data including a moving object can be stored. However, the data is stored independently of an unmoving object. Further, an unmoving object cannot always be reliably shot or the position thereof cannot always be specified. On the other hand, in a system capable of detecting only unmoving objects, all images must be stored in order to store images including a moving object (e.g., a person who put an explosive and went away).

Compared to these systems, in the system according to the embodiment, images including an unmoving object and images including a moving object can be realizably stored, so that the storage capacity can be reduced. Among images including a moving object, images other than the image captured just before an unmoving object is detected can be deleted. In that case, a necessary storage capacity can be further reduced. Alternatively, the IP camera can select and transmit only the image captured just before an unmoving object is detected. In this way, since minimum image data is transmitted, a network traffic jam can be alleviated.

As described above, in the image pickup apparatus according to the embodiment of the present invention, unmoving-object detection is performed therein so that an explosive (unmoving object) left by someone can be detected. Further, video data of the unidentified person (moving object) who places the explosive can be recorded by moving-object detection. Therefore, data can be flown through a network only during a period when a moving object exists in a monitoring area of the IP camera. Also, only video images showing a necessary moving object or unmoving object can be selected and stored. Accordingly, compared to the known monitoring camera system having a moving-object detecting function, the storage capacity can be significantly reduced while reliably storing necessary video images, and as a result, a monitoring operation can be efficiently performed.

In the above-described embodiment, image data of a plurality of different encoding methods are generated and transmitted. However, the same effect can be obtained if a plurality of image data having the same encoding method and different bit rates are generated.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus capable of distributing a picked up image through a network, the image pickup apparatus comprising:

image pickup means for picking up an image of a predetermined monitoring area and outputting an image signal thereof;

a plurality of encoding means for simultaneously converting the image signal into video data of different encoding methods;

moving-object detecting means for detecting a moving object that entered the monitoring area based on the image signal;

unmoving-object detecting means for detecting an unmoving object in the monitoring area based on the image signal, the unmoving object detecting means storing a frame count and a stay period for each unmoving object detected; and transmission control means for controlling distribution of video data of the unmoving object to the network based on the frame count and the stay period generated by the unmoving-object detecting means, the transmission control means distributing the video data of the unmoving object which includes all video data including the unmoving object and no video data not including the unmoving object based on the frame count and the stay period of the unmoving object.

2. The image pickup apparatus according to claim 1, wherein the transmission control means distributes the video data encoded by the encoding means only during a period when a moving object is detected by the moving-object detecting means, and when an unmoving object is detected by the unmoving-object detecting means.

3. The image pickup apparatus according to claim 2, wherein the transmission control means distributes data that is encoded at a high compression rate among the video data during the period when a moving object is detected by the moving-object detecting means, and distributes data that is encoded at a low compression rate when an unmoving object is detected by the unmoving-object detecting means.

4. The image pickup apparatus according to claim 1, wherein the moving-object detecting means and the unmoving-object detecting means have a function of generating detection information including at least one of coordinates, size, speed, detection time, and detection condition of a detected moving object or unmoving object in an image, and wherein the transmission control means distributes the detection information corresponding to a time at which a moving object or unmoving object is detected through the network.

5. The image pickup apparatus according to claim 1, further comprising:

switching means for switching the encoding methods applied to the video data that is to be output to the network by the transmission control means in accordance with a selection signal from a user terminal connected through the network.

6. The image pickup apparatus according to claim 1, wherein the transmission control means has a function of controlling synchronization between the video data converted by the encoding means and each detection result generated by the moving-object detecting means and the unmoving-object detecting means based on a frame number assigned to each frame of the image signal.

7. The image pickup apparatus according to claim 1, further comprising:

recording means for recording the video data.

8. An image pickup apparatus according to claim 1, wherein the transmission control means distributes the video data encoded by the encoding means during a predetermined period before and after the detection of the unmoving object by the unmoving-object detection means.

9. The image pickup apparatus according to claim 8, wherein the transmission control means distributes data that is encoded at a low compression rate during the predetermined period before and after detection of the unmoving object by the unmoving-object detecting means.

10. The image pickup apparatus according to claim 1, wherein the transmission control means distributes only the video data of the moving object encoded by the encoding means during a period immediately before an unmoving object is detected by the unmoving-object detecting means.

11. The image pickup apparatus according to claim 1, wherein the transmission control means deletes the video data of the moving object encoded by the encoding means during a period more than a predetermined amount of time before an unmoving object is detected by the unmoving-object detecting means.

12. The image apparatus according to claim 1, wherein the transmission control means deletes the video data of the moving object encoded by the encoding means during a period ending immediately before the unmoving object is detected by the unmoving-object detecting means.

13. The image apparatus according to claim 1, wherein the moving object detecting means stores a frame count and a stay period for each moving object detected.

14. An image distributing method for distributing a picked up image through a network, the image distributing method comprising:

simultaneously converting an image signal that is obtained by picking up an image of a predetermined monitoring area into video data of different encoding methods;

detecting a moving object entered the monitoring area based on the image signal;

detecting an unmoving object in the monitoring area based on the image signal and storing a frame count and a stay period for each unmoving object detected; and controlling distribution of video data of the unmoving object to the network based on the frame count and the stay period, the controlling distribution including distributing the video data of the unmoving object which includes all video data including the unmoving object and no video data not including the unmoving object based on the frame count and the stay period of the unmoving object.

15. An image pickup apparatus capable of distributing a picked up image through a network, the image pickup apparatus comprising:

an image pickup unit configured to pick up an image of a predetermined monitoring area and output an image signal;

a plurality of encoding units configured to simultaneously convert the image signal into video data of different encoding methods;

a moving-object detecting unit configured to detect a moving object entered the monitoring area based on the image signal;

an unmoving-object detecting unit configured to detect an unmoving object in the monitoring area based on the image signal, the unmoving object detecting unit configured to store a frame count and a stay period for each unmoving object detected; and a transmission control unit configured to control distribution of video data of the unmoving object to the network based on the frame count and the stay period generated by the unmoving-object detecting unit, the transmission control unit configured to distribute the video data of the unmoving object which includes all video data including the unmoving object and no video data not including the unmoving object based on the frame count and the stay period of the unmoving object.

* * * * *